United States Patent
Markus et al.

(10) Patent No.: US 9,965,364 B2
(45) Date of Patent: *May 8, 2018

(54) FAULT TOLERANT LISTENER REGISTRATION IN THE PRESENCE OF NODE CRASHES IN A DATA GRID

(71) Applicant: Red Hat, Inc., Raleigh, NC (US)

(72) Inventors: Mircea Markus, London (GB); William Rosenquist Burns, Annapolis, MD (US)

(73) Assignee: Red Hat, Inc., Raleigh, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/589,465

(22) Filed: May 8, 2017

(65) Prior Publication Data

US 2017/0242761 A1 Aug. 24, 2017

Related U.S. Application Data

(63) Continuation of application No. 14/609,329, filed on Jan. 29, 2015, now Pat. No. 9,652,339.

(60) Provisional application No. 62/073,861, filed on Oct. 31, 2014.

(51) Int. Cl.
| | |
|---|---|
| *G06F 11/00* | (2006.01) |
| *G06F 11/16* | (2006.01) |
| *G06F 17/30* | (2006.01) |
| *G06F 11/07* | (2006.01) |
| *G06Q 20/40* | (2012.01) |
| *G06Q 40/02* | (2012.01) |

(52) U.S. Cl.
CPC ...... *G06F 11/1662* (2013.01); *G06F 11/0709* (2013.01); *G06F 11/0757* (2013.01); *G06F 17/30339* (2013.01); *G06F 2201/805* (2013.01); *G06F 2201/82* (2013.01); *G06Q 20/4016* (2013.01); *G06Q 40/02* (2013.01)

(58) Field of Classification Search
CPC ............ G06F 11/1658; G06F 11/2058; G06F 11/2094; G06F 17/30477; G06F 17/30867
See application file for complete search history.

(56) References Cited

U.S. PATENT DOCUMENTS

| | | | |
|---|---|---|---|
| 7,523,500 B1 | 4/2009 | Szor et al. | |
| 7,984,043 B1 | 7/2011 | Waas | |
| 9,652,339 B2 * | 5/2017 | Markus | ............... G06F 11/1658 |

(Continued)

OTHER PUBLICATIONS

Oracle Coherence Documentation, Coherence Developer's Guide, "Using Cache Events," http://docs.oracle.com/cd/E15357_01/coh.360/e15723/api_events.htm#COHDG5187, accessed Dec. 1, 2016, 11 pages.

(Continued)

*Primary Examiner* — Philip Guyton
(74) *Attorney, Agent, or Firm* — Lowenstein Sandler LLP

(57) ABSTRACT

A processing device to receive, from a second node in the data grid system, a first filter. The processing device may detect a failure of a third node of the data grid system. The processing device may determine that the backup data stored at the first node matches the first filter. The processing device may send, to the second node, a duplicate data notification indicating that the backup data comprises, at least in part, first data duplicative to second data communicated to the second node from the third node.

20 Claims, 13 Drawing Sheets

(56) References Cited

U.S. PATENT DOCUMENTS

| | | |
|---|---|---|
| 2005/0044064 A1 | 2/2005 | Haase |
| 2009/0276654 A1 | 11/2009 | Butterworth et al. |
| 2010/0262871 A1 | 10/2010 | Bain |
| 2011/0228668 A1* | 9/2011 | Pillai .................. G06F 11/2023 370/217 |
| 2014/0108861 A1 | 4/2014 | Abadi et al. |
| 2014/0244578 A1 | 8/2014 | Winkelstraeter |
| 2016/0026667 A1 | 1/2016 | Mukherjee et al. |
| 2016/0125014 A1 | 5/2016 | Markus et al. |
| 2016/0125086 A1 | 5/2016 | Markus et al. |

OTHER PUBLICATIONS

GitHub, Inc., "Clustered Listeners," https://github.com/infinispan/infinispan/wiki/Clustered-listener, Sep. 25, 2014, 3 pages.

Notice of Allowance dated Oct. 5, 2017, on U.S. Appl. No. 14/609,315.

Non-Final Office Action dated Sep. 1, 2017, on U.S. Appl. No. 14/609,329.

Notice of Allowance dated Jan. 12, 2017, on U.S. Appl. No. 14/609,329.

Non-Final Office Action dated Aug. 28, 2017, on U.S. Appl. No. 14/609,333.

* cited by examiner

FAULT TOLERANT LISTENER REGISTRATION IN THE PRESENCE OF NODE CRASHES IN A DATA GRID

CROSS-REFERENCE TO RELATED APPLICATIONS

This application is a continuation of U.S. patent application Ser. No. 14/609,329, filed Jan. 29, 2015, which claims the benefit of U.S. Provisional Application No. 62/073,861, filed Oct. 31, 2014. The entire contents of these applications are incorporated herein by reference. This application is related to U.S. patent application Ser. No. 14/609,315, filed on Jan. 29, 2015 and is this application is related to U.S. patent application Ser. No. 14/609,333, filed on Jan. 29, 2015.

TECHNICAL FIELD

The present disclosure pertains to computer systems; more specifically, to transferring of data stored in the memory of nodes in a data grid.

BACKGROUND

Data, such as software programs, information, or other forms of data, has become a resource and asset for many individuals and businesses. A data grid is a distributed database system within the boundaries of a data center that can store and manage data across multiple nodes, particularly when the amount of data is relatively large. For example, the data grid can be a collection of nodes (e.g., a node cluster) with an increased computing power and storage capacity. The data can be stored at different nodes in a node cluster or at different node clusters. Data grids can provide functionalities such as querying, processing for streaming data, and transaction capabilities.

DESCRIPTION OF EMBODIMENTS

Figure 1:
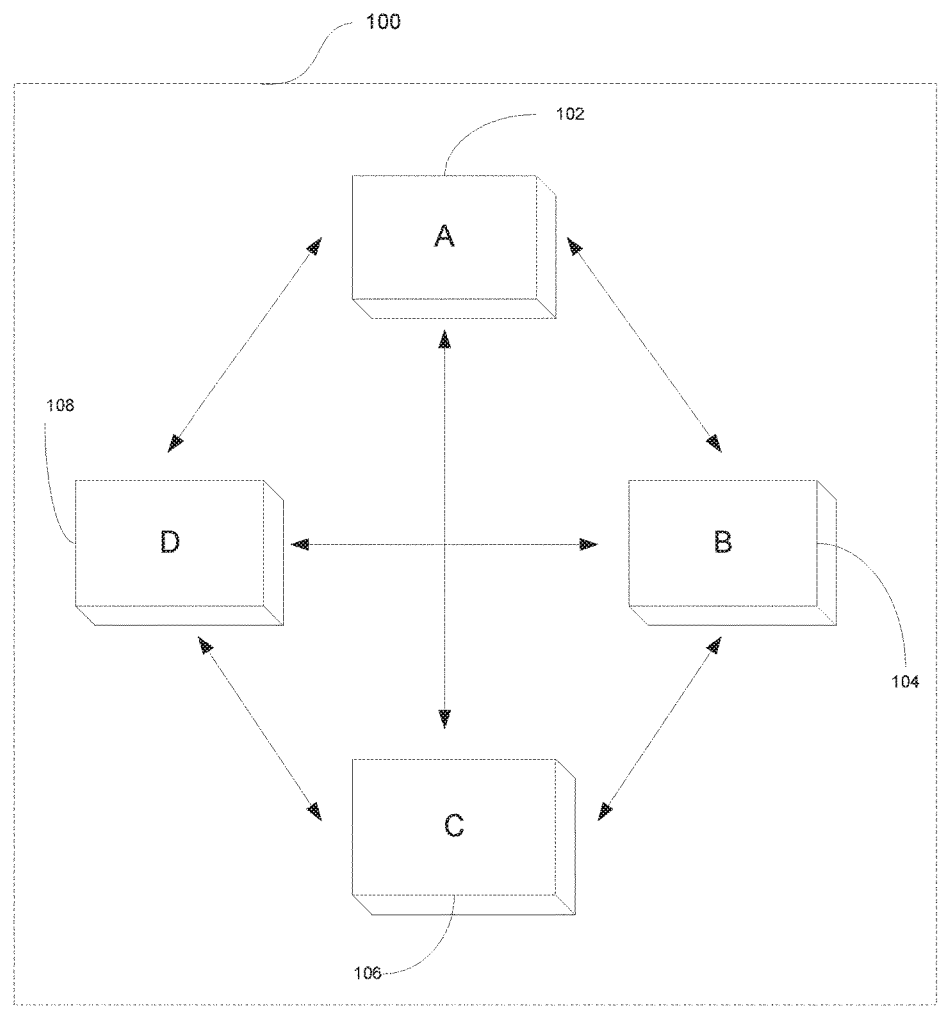
FIG. 1 illustrates a block diagram of nodes in a cluster according to one embodiment.

Data transfer technologies are described herein.

Data is becoming an increasingly important resource and asset to businesses and individuals. Individuals or businesses may store data on a single machine or a single server to provide a fixed and definite location of the data. However, as the amount of data stored and used by individuals and businesses increases, maintaining the data used by that individual or business at a single machine or server can become difficult. In one example, a rate at which data is uploading to a single machine or server in combination with a rate that users access the data can overwhelm a single machine or server. Organizations may use a data grid to store large amounts of data and/or access data owned and stored by multiple organizations. Data grids can manage distributed data, where the data can be stored across multiple locations and multiple types of storage devices. Additionally, a data grid can use a common access method, a common naming scheme, a common authentication method, a common management policy, and so forth. The data grid can be a collection of nodes (e.g., a node cluster), where each node has a memory, such as a cache, for storing data. Storing data at different nodes in a node cluster or different node clusters can provide increased data access rates and data security for the individuals or businesses. A node can be a physical machine, a virtual machine, a computer a server, a collection of physical machines or virtual machines, and so forth. When a user desires to access data in the data grid, an application can query data stored in the data grid using an iteration process, as discussed in more detail in the proceeding paragraphs. As data is queried by the application, the data can be accessed, updated, and/or modified by other applications during the iteration process.

Traditionally, when data is updated or modified at a cache of a node, providing up-to-date data to the querying application while the data is being accessed and iterated over can be difficult. In one example, traditionally when a cache entry occurs at a node during an iteration process, the cache entries can be overlooked or sent to the querying application out of order. When data is overlooked, the querying application may not receive an up-to-date data set to analyze and/or provide to a user. When data is sent to a querying application out of order, the querying application may erroneously analyze the out of order data and/or report incorrect information to a user. For example, when the querying application is for a banking application (such as fraud detection or banking account balance querying), missing data or out of order data can cause banking fraud to go undetected or an account balance to be incorrect.

Aspects of the present disclosure address the above-noted deficiency by maintaining a queue of when data is updated or modified at a cache of a node during an iteration process and reporting the queued data to the querying application to maintain data order and provide up-to-date data. Maintaining a queue of changes to a cache of a node during the iteration process can track changes that occur at a location in the cache where the entries have already been iterated over during the iteration process and track when the changes occur. For example, a cache entry at the top of a cache may have initially been iterated over and a first value may have sent to a querying application. In this example, during the iteration process, the cache entry at the top of the cache can be changed after the data of the cache entry was already sent to the querying application.

A queue can be maintained in order to keep track of when the new data was written, modified, or deleted in the cache. For example, the querying application may be for a bank monitoring an amount that an individual has in their bank account. In this example, as the querying application of the bank iterates over account balance information for the individual, the bank may desire to know when old account balance information was modified and/or when new banking information is added at a cache entry already iterated over at a node. When the node maintains a queue of cache entry writes, modifications, or deletions, the bank can receive the queued information and determine a correct current account balance of the individual.

As a query is performed in a data grid, a node where the cache is being iterated over may fail. A node may fail for a variety of reasons, such as a disk failure or a process crash. In order to protect the data at the nodes in a data grid against a node failure, intra-cluster data replication or local data replication can be used to replicate data between multiple nodes (such as servers) within a cluster of nodes (cluster) of a data grid system. The intra-cluster data replication can provide data redundancy when one or more nodes are unavailable in the cluster, such as when one or more nodes fail. In one example, data can be distributed uniformly across all the nodes in a cluster, with each node storing a replica of data (backup data) of other nodes in the cluster. For example, when new data is added to one or more nodes in the cluster, the data can be persisted or backed up to other nodes within the cluster. When a node in the cluster goes down, backup data on one of the other nodes in the cluster can be used as active data, e.g., data accessed and/or used by the cluster for different applications. In another example, each node in the cluster can store active data and backup data of another node. Additionally, when a new node is brought online in a cluster, data that already exists at a peer node can be transferred to the new node as part of an initialization process.

When a node fails in a data grid during an iteration process, the cluster can continue performing a query. Backup data of the failed node stored at other nodes in the data grid can be iterated over to compensate for the loss of the failed node. Traditionally, when the backup data is sent to the querying application, duplicate data is often sent as part of query results. For example, prior to the node failure, the failed node may have sent a portion of data that matches the query criteria. In this example, when the node fails and the backup data at another node is queried over, the entire backup data is iterated over as the backup node does not know when the node failed during the iteration process. Because the entire backup data is iterated over, there is duplicative data in the results for the data sent by the failed node prior to failure and the data sent from the backup node.

Traditionally, when the application received the data from the query, the duplicate data caused inconsistencies in the query results.

Aspects of the present disclosure address the inconsistencies caused by the duplicate data by providing a duplicate data notification to a cluster listener along with filtered backup data. The duplicate data notification can indicate to the listener node that the filtered backup data received from the backup node may contain duplicative data sent by the failed node prior to the node failure. An advantage of indicating to the cluster listener that the query results may contain duplicative data can be to enable the cluster listener to omit the duplicative data from the query results.

Additionally, if the failed node was maintaining a queue of the changes to the caches of the node prior to the node failing, the queue may be lost during the node failure. To provide the listener with up-to-date filtered data, the backup node can rebuild the queue of cache entries that occurred at the failed node prior to the node failure. An advantage of rebuilding the queue of cache entries can be to enable the cluster listener to receive up-to-date data that is in order.

FIG. 1 illustrates a block diagram of nodes 102, 104, 106, and 108 in a cluster 100. The nodes 102, 104, 106, and 108 can include caches for storing data. An instance of a cache at a node can be replicated to another cache node in the cluster 100. In one example, data from a cache of node 102 can be replicated to the caches of nodes 104, 106, and/or 108. In another example, data from the cache of node 104 can be replicated to the caches of nodes 102, 106, and/or 108. In another example, data from the cache of node 106 can be replicated to the caches of nodes 102, 104, and/or 108. In another example, data from the cache of node 108 can be replicated to the caches of nodes 102, 104, and/or 106.

Figure 2:
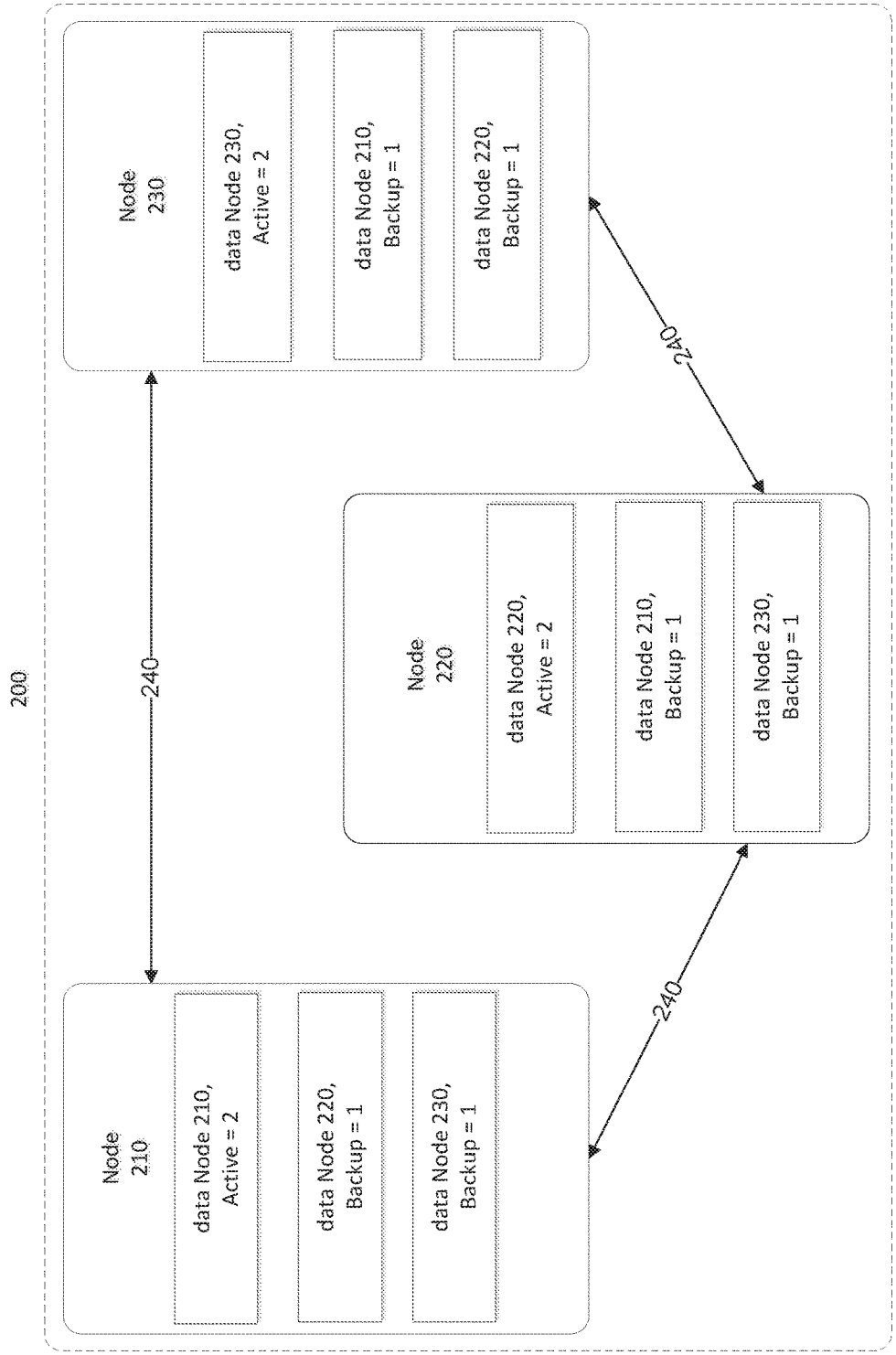
FIG. 2 illustrates a data grid with a plurality of nodes according to one embodiment.

FIG. 2 illustrates a data grid 200 with a plurality of caches or nodes 210, 220, and 230. For example, data grid 200 can be a cache manager containing multiple caches. FIG. 2 further illustrates the plurality of nodes 210, 220, and 230 that can be used as active nodes (e.g., primary nodes) and backup nodes (e.g., secondary nodes). In one example, each node 210, 220, and 230 can store data of the data grid 200. In another example, each node 210, 220, and 230 can store all the data of the data grid 200. In one example, a node 210, 220, and/or 230 can have a primary backup (e.g., a data backup for the active node) and a secondary backup (e.g., a data backup for other nodes). In another example, the primary backup can store multiple copies of the data (such as 2 copies of the data) for the node where the memory is located, and the secondary backup can store a single copy of the data for the other nodes. In another example, the primary backup can store one copy or multiple copies of the data for the node where the memory is located and the secondary backup can store one copy or multiple copies of the data for the other nodes, or any combination thereof. To transfer data between the nodes and/or backup data, nodes 210, 220, and/or 230 can use a communication link 240. The use of a data grid 200 in FIG. 2 is an example and is not limiting. In another example, the nodes 210, 220, and 230 can be in a database and the nodes can include tables of data.

In one example, within each node 210, 220, and 230 a different number of backups can be configured for local data and for backup data. For example, the node 210 can store 2 backups for a node 210 data partition and store 1 backup for a node 220 data partition and 1 backup for a node 230 data partition. In another example, the node 220 can store 2 backups for a node 220 data partition and store 1 backup for a node 210 data partition and a node 230 data partition. In another example, the node 220 can store 4 backups for a node 220 data partition and store 5 backups for a node 210 data partition. These examples are not intended to be limiting. The number of backups at a node and which node or nodes the backup data is stored at can vary. In one example, data replication or backup between nodes can be synchronous. In another example, data replication or backup between nodes can be asynchronous or configurable.

A cache at a node can include multiple cache entries, where each cache entry includes a key and a value pair, i.e. a (key, value) pair. The (key, value) pair can include an identification (ID) value (the key) that is associated with data (the value). For example, the (key, value) pair can be an ID value associated with information about a person, e.g., (ID, Person). The (key, value) pair can be used to perform different functions at nodes in a data grid, such as data reads, data writes, or data deletions.

Figure 3A:
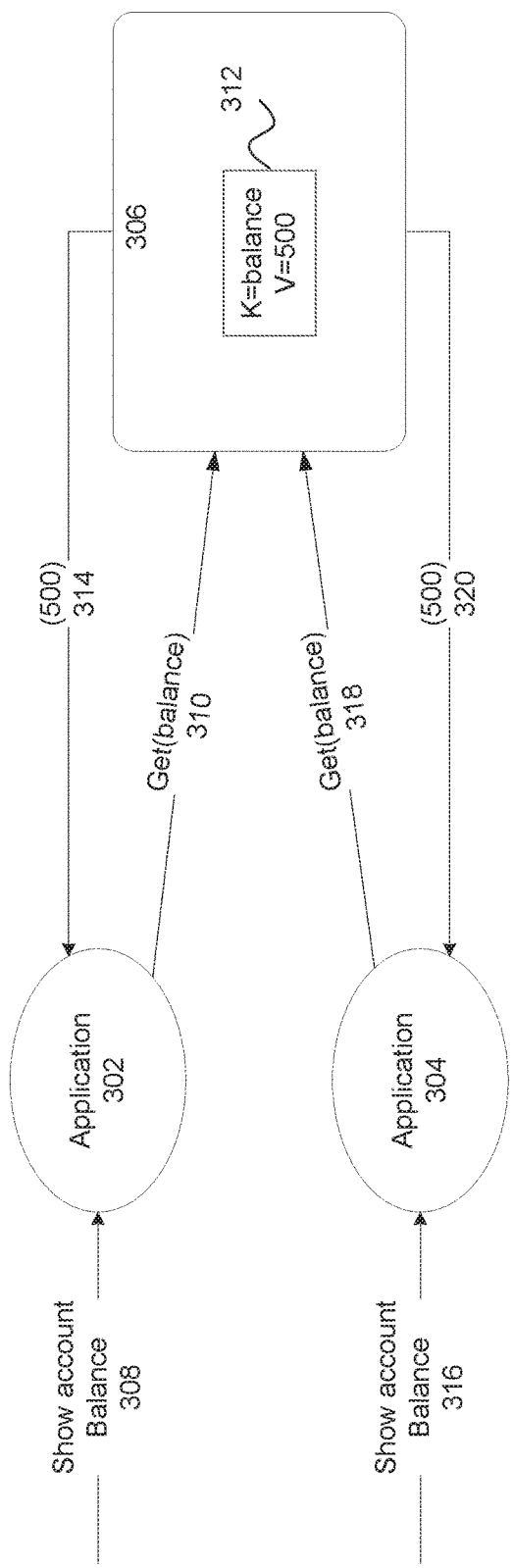
FIG. 3A illustrates applications receiving a request to retrieve data from a node cluster according to one embodiment.

FIG. 3A illustrates applications 302 and 304 receiving a request (such as a request from an ATM or a bank, e.g., a get request) to retrieve an account balance for an individual (steps 308 and 316) from a node cluster 306. FIG. 3A further illustrates that applications 302 and 304 can send read commands 310 and 318 (e.g., get (balance)) to the node cluster 306. The cache entries of nodes in the node cluster 306 can be iterated through and the account balance can be found at node 312 (e.g., an account balance of 500). In one example, the node 312 can communicate the account balance to the applications 302 and 304 (steps 314 and 320).

Figure 3B:
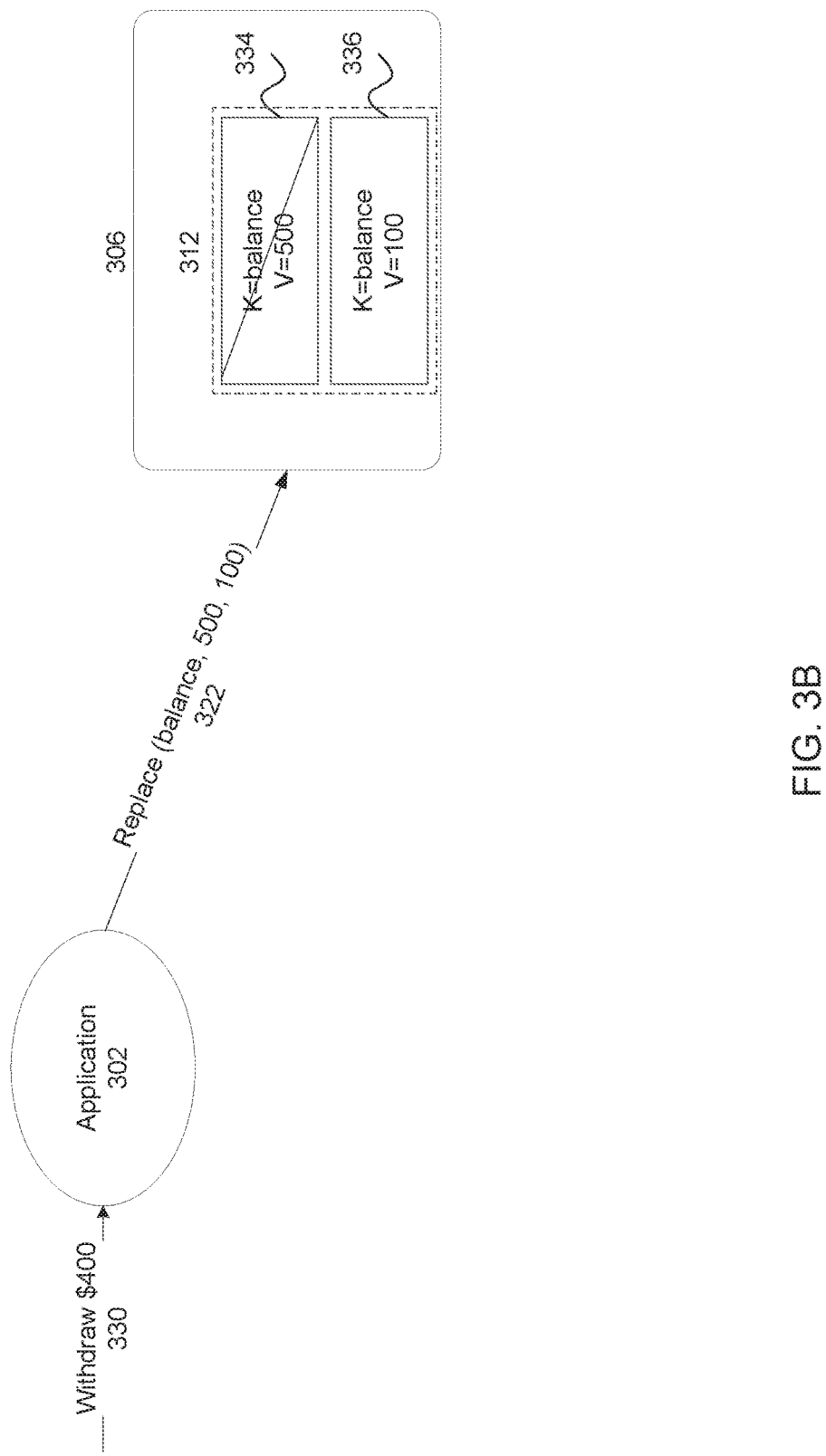
FIG. 3B illustrates an application receiving a request to modify data from a node cluster according to one embodiment.

FIG. 3B illustrates application 302 receiving a request (such as from an ATM or a bank) to withdraw an amount from an account balance for an individual (step 330) from a node cluster 306. FIG. 3B further illustrates that application 302 can send a replace command 332 (e.g., get(balance)) to the node cluster 306 (step 322). The cache entries of nodes in node cluster 306 can be iterated through and the account balance of 500 can be found at node 312 (step 334). The account balance can be replaced with an account balance of 100 (step 336). In another example, data can be removed or deleted at a node in the cluster using a delete command, such as a delete(key) command (not shown in the figures).

To track or monitor the addition or removal of cache entries at the nodes in a cluster, modifications to the cache entries at the nodes, and so forth, listeners may be used. A listener is an application registered on a node that can be used to query for requested data. In one example, local listeners can be used in a distributed node configuration. The local listeners can be located locally at different nodes in the cluster. The local listeners can receive notifications (e.g., listen for notifications) of events or operations at the cache of a node where the local listener is registered. The events or operations can include data updates, data removal, data modification, and so forth. In one example, a local listener can be notified twice of an event or operation at the cache of the node, once before the operation is completed and once after the operation is completed. In another example, for a node with a transactional cache, the local listener can be notified when a transaction begins and notified when the transaction is completed (such as via a rollback or a commit command).

To determine what data is stored at the nodes in a cluster, the data at the caches of the nodes can be iterated through. For example, data entries of a cache can be iterated through using a consistent hash function, e.g., CH(key)→nodes. In one example, multiple caches of nodes in a cluster can be iterated through sequentially, e.g., a cache of one node can be iterated through before the cache of another node is iterated through. In another example, the caches of the multiple nodes in a cluster can be iterated through at the same time, e.g., simultaneous iteration of multiple caches. An advantage of simultaneous querying multiple nodes can be to decrease an overall query time of a cluster.

In one example, the local listeners can be local to the node where an event occurs. A data grid can include data which is stored at the caches of nodes A, B, C, D, and E (numOwners=2). The data grid can use a key (K) to select local listeners to receive activity or event notification for activities or events at selected nodes, e.g., owners(K)={A,B}. In this example, local listeners at nodes A and B can receive activity or event notifications for activities or events (such as an entry, removal, or update of data) at caches of nodes A and B related to the key K. Additionally, the local listener at node C may not receive any notifications for activities or events related to the key K.

Alternatively, a clustered listener can be used in a data grid, such as in a distributed node configuration. In one example, a clustered listener can represent a single listener installed at a listener node to receive event notifications that occur at caches of nodes in the cluster. The event notifications can include: a notification for a data entry event or a data creation event at a cache of a node in the cluster (a CacheEntryCreatedEvent notification), a notification for modification to data at the cache of the node in the cluster (a CacheEntryModifiedEvent notification), and a notification for removal of data at the cache of the node in the cluster (a CacheEntryRemovedEvent notification). Whereas local listeners in a distributed cache may only be notified of events for the cache at the node where the data resides, a clustered listener is a single listener that receives notifications (such as CacheEntryCreatedEvent notifications, CacheEntryModifiedEvent notifications, and CacheEntryRemovedEvent notifications) that occur in the different caches of the nodes in the cluster where the cluster listener is installed at the listener node.

An advantage of a cluster listener receiving event notifications that occur at caches of nodes in the cluster can be that when an iteration process, such as for a query search, is performed at a node and new data is written to the node during the iteration process, an order of the initial data and the new data can be maintained. For example, when a cluster listener is installed to monitor and query data in the cluster for credit card fraud detection, transactions for different customers can occur on a frequent basis. In this example, when a query search for possible fraudulent charges to a credit card is initiated, data can be iterated through for different caches of nodes in the cluster. While the iteration process is occurring, a new transaction may take place that relates to the query search. The cluster listener can receive an event notification when an event (such as a transaction) has occurred at the cache of a node in the cluster and maintain an order of the transaction as they occur. The cluster listener can enable a node to continuously or on a periodic basis query the node cluster.

In one example, a cluster listener can receive notifications when an operation begins and when the operation ends. In another example, a cluster listener can receive notification after the operation is completed. In another example, the cluster listener can be notified after data has been updated or modified, i.e. notifications of committed entries. In this example, the cluster listener may not receive notifications for transaction registering events (TransactionRegisteredEvent) or for transaction completed events (TransactionCompletedEvent). An advantage of the cluster listener receiving notification when the operation is completed can be to avoid a false positive of a completion of the event before the entire operation has completed.

In one example, the cluster listener can be installed at a listener node. A data grid can include numOwners=2 that run on nodes A, B, C, D, and E and a key K in the data grid, with owners(K)={A,B}. In this example, the cluster listener can be notified of events, irrespective of where the events occurred (e.g., irrespective of which node the event occurred at). For example, a cluster listener registered on node C can receive notifications of events originated by a key to add, remove, or modify data at nodes A, B, D, and/or E.

Figure 4A:
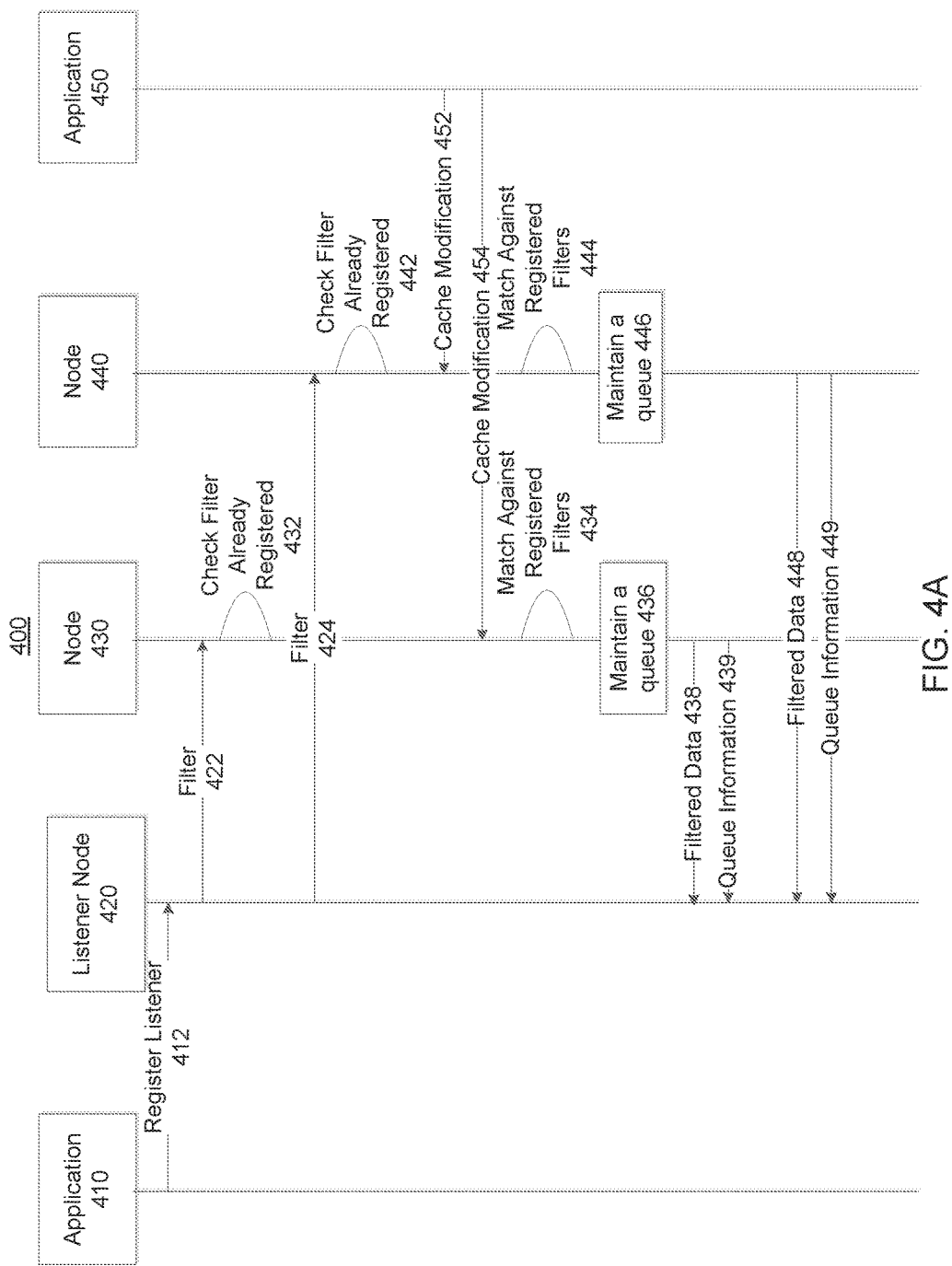
FIG. 4A depicts a sequence diagram of a method of monitoring data addition, removal, or modification in a data grid according to one embodiment.

FIG. 4A depicts a sequence diagram of a method 400 of monitoring data addition, removal, and/or modification in a data grid. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by a processor, a plurality of processors, a processor core, and/or a plurality of processor cores. Alternatively, other components of a computing system or software executing on the processor may perform some or all of the operations of the method 400.

Referring to FIG. 4A, the method 400 can begin by an application 410 registering or installing an iterator, e.g., a cluster listener, at a listener node 420 (step 412). In one example, the application 410 can be a web application that sends a cluster listener to the listener node 420. In another example, the application 410 can be a remote client that sends a query request. In another example, the application 410 can be aware of the topology of the cluster and select a node to install the cluster listener at. For example, the application 410 may be aware that a node in the cluster has fewer cluster listeners installed on the node than other nodes in the cluster and select the node to send the cluster listener to for installation. In another example, the application 410 may randomly select a node to send the cluster listener to.

In one example, the cluster listener can be a functional handler that accepts the results of an iteration process of nodes in a data grid. In another example, the cluster listener can include a filter, such as a data filter. The cluster listener can be notified of events in the cluster that pass or satisfy criteria of the filter.

The listener node 420 may not know what data is stored at different nodes in the data cluster. The listener node 420 can communicate the filter to node 430 in a cluster of the data grid (step 422). In one example, the node 430 can use the filter when iterating over cache entries to determine which cache entries match query criteria of the filter. In another example, the cluster in the data grid can include multiple listener nodes that communicate filters to other nodes in the cluster. The node 430 can check if the filter received from the listener node 420 has already been registered for use by another cluster listener in the cluster (step 432). In one example, the multiple listener nodes may not be aware of the other filters installed on the other nodes. For example, listener node 420 may not be aware of other filters installed by other listener nodes at node 430 but node 430 can be aware of the different filters registered at node 430. When the filter has previously been received from the other cluster listener, the node 430 may not install duplicative filters at the node, but rather use the one filter and communicate data matching the filter to both of the cluster listeners.

The listener node 420 can also communicate the filter to a node 440 in the cluster of the data grid (step 424). The node 440 can check if the filter is already registered for use by other cluster listeners in the cluster (step 442). In one example, nodes 430 and/or 440 can use the filter to map a set of nodes interested in events matching the filter, such as the filter={Listener Node 410, Node X}. In another example, nodes 430 and/or 440 can use filter parameters to determine which events should be communicated to the cluster listener.

In one example, a filter and a projector can be associated with the cluster listener to reduce network chattiness and increase a performance of the data grid. A projector can represent an application to extract information from a subset of data. In one example, the filter can select a subset of data (e.g., relevant data) for the cluster listener. For example, a data set can include the names and ages of multiple people and the filter can select people with an age above 18 years old. In another example, the projector can extract information from the data subset (e.g., relevant bits) of the filtered data and pass the information to the cluster listener. For example, a query may be for names of people and the projector can send only the names people selected by the filter, e.g., the projector can remove the age info from the filtered data that is sent to the listener. One advantage of using the filter and the projector can be to reduce network traffic by enabling nodes to communicate relevant data to the cluster listener at the node 420.

An application 450 can communicate a cache modification to the node 440 and/or node 430 in the data grid (steps 452 and 454). In one example, the cache modification can be: a cache write, such as a Put (k, v) command; a cache entry removal or deletion, such as a Delete (k, v) command; or a cache modification. In one example, the node 430 and/or the node 440 can receive multiple cache modifications at the same time. In another example, the application 450 can be aware of the topology of the cluster and select a node in the cluster to write a cache entry to. In another example, the node selection may be a specific node selection when the application is aware of where the cache entry should be written. In another example, the application may choose a node at random to write data to, and the randomly selected node can direct the data write to a node where the cache entry should be written (e.g., the node that owns the cache entry). The node that owns the cache entry can be determined by applying a consistent hash function on a key of the cache entry.

The node 430 and node 440 can monitor for cache modification or cache entry events (e.g., when data is written or modified at the cache of the node 430 or 440) and determine when a cache entry event occurs that matches a filter registered at node 430 and/or node 440 (steps 434 and 444). When node 430 or node 440 determines that a cache entry event has occurred that matches the filter, node 430 and node 440 can maintain queues of the cache entry events that have occurred that match the filters registered at node 430 or node 440, respectively (steps 436 and 446). The node 430 or the node 440 can then communicate the filtered data to the listener at the listener node 420 (steps 438 and 448). When the nodes 430 and 440 in the data grid have completed an iteration process, the nodes 430 and 440 can communicate the cache entry events that are queued at the nodes 430 and 440, respectively (steps 439 and 449).

In one example, node 430 can finish iterating through the cache entries at the node 430 and communicate the filtered data and the queued data at a first time. In another example, node 440 can finish iterating through the cache entries at the node 440 and communicate the filtered data and queued data at a second time. In another example, nodes 430 and 440 can communicate the filtered data and the queued data at the same time. In another example, the filtered data can be sent in a first message and the queued data can be sent in a second message. In another example, the filtered data and the queued data can be sent in the same message.

In one example, after the iteration process has completed and the filtered data and queued data have been sent to the listener at the listener node 420, the filter may remain at the nodes 430 and 440, e.g., the filter is not uninstalled. When new cache entries are added, modified, or removed from the cache of node 430 or 440, the filter at node 430 or 440 can determine when the newly written cache entries match the filter. When the new cache entries match the filter at node 430 or 440, the filter can notify the listener at listener node 420 directly of the matching cache entries, e.g., without having to maintain a queue. In this example, the queue may be maintained while the initial iteration process takes place and after the iteration process is finished, the filter can send the cache entry information write to the listener directly.

Traditionally, when cache entries occur at a node during an iteration process, the cache entries were overlooked or sent to a querying application out of order. An advantage of maintaining a queue of changes to a cache of a node during the iteration process can be to track changes that occur at a location in the cache where the entries have already been iterated over during the iteration process. In one example, a credit card company can monitor for fraud detection. In this example, cache entries at a node in a cluster can be iterated through multiple times using the same or different filters. Additionally, customers of the credit card company can use their credit cards frequently, causing multiple transactions to be written into cache entries of a node on a regular or frequent basis. A listener may be installed by a first application for the credit card company to detect fraud, e.g., monitor the transactions of users to detect possibly fraudulent transactions. A second application for stores where customers purchase items can write data to a cache of a node. As the node iterates through the cache entry in view of a query search from the first application to monitor for fraudulent credit card charges, the node can maintain a queue of the cache entries (credit card transactions) from the second application to enable the credit card company to determine when cache entries were added, modified, or removed.

Figure 4B:
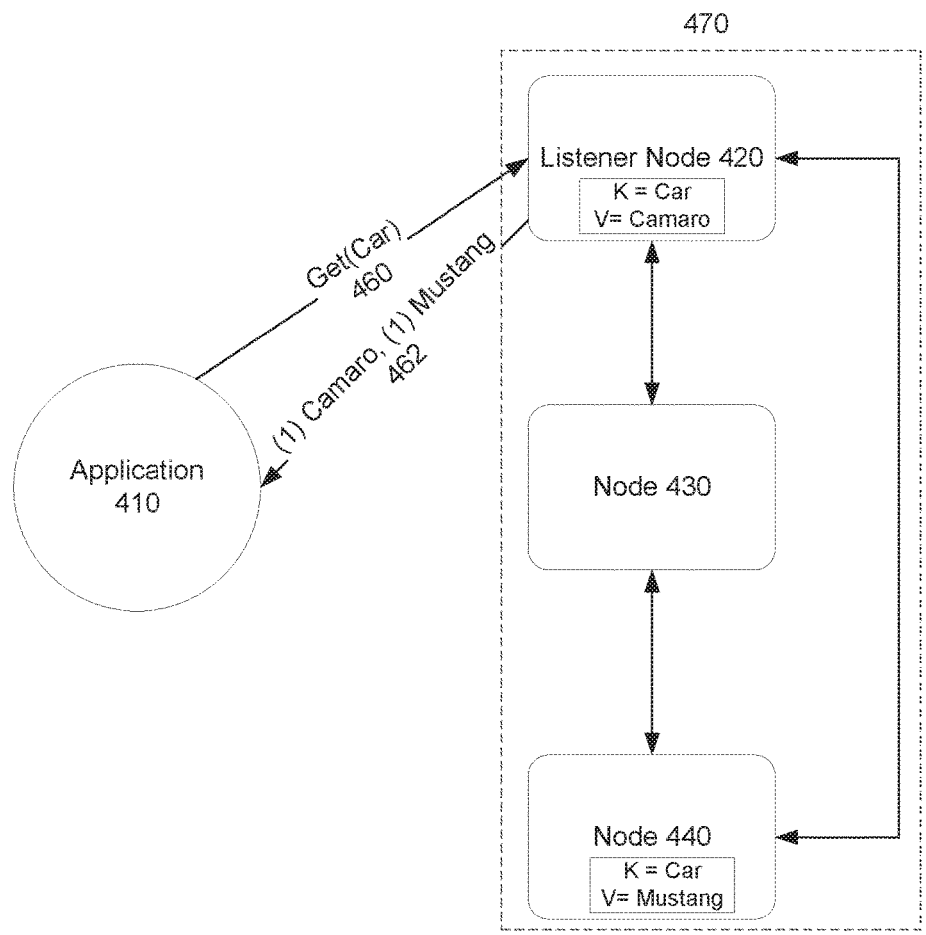
FIG. 4B illustrates an application performing a query in a cluster of a data grid according to one embodiment.

FIG. 4B illustrates an application 410 performing a query in cluster 470 of a data grid. Application 410 can send a listener to a listener node 420 in the cluster 470. In one example, the listener can be for a query or search request and include query or search criteria, such as a request to query for car data in the cluster 470. The listener node 420 can receive the listener and register the listener at the listener node 420. In one example, nodes 420, 430, and 440 can be interconnected and communicate requests and information between the nodes 420, 430, and 440. As discussed in the preceding paragraphs, an iteration process can be performed at the nodes 420, 430, and 440 of the cluster 470 to find the car data. When the nodes 420, 430, and 440 are queried, nodes 420 and 440 can include cache entries with car data, e.g., data for a Mustang and for a Camaro. The listener at the listener node 420 can receive the car data and communicate the car data to the application 410 (step 462).

Figure 4C:
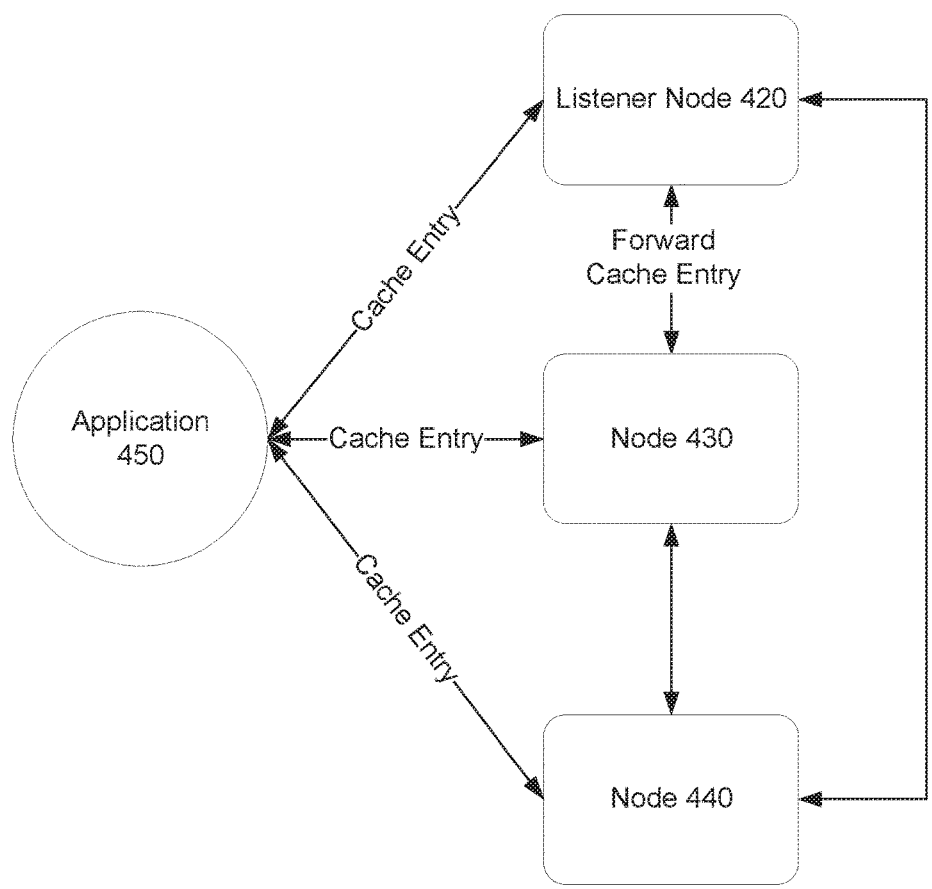
FIG. 4C illustrates an application modifying a cache of nodes according to one embodiment.

FIG. 4C illustrates an application 450 modifying a cache of nodes 420, 430, and/or 440. In one example, the application can send data to a listener node 420 in the cluster (e.g., a cache entry command such as put (car1, mustang)) and the listener node 420 can forward the data to node 430 in the cluster. In another example, the application 450 can send data to node 430 or 440 in the cluster and the node 430 or 440 can forward the information to node 420, 430, or 440, respectively. An advantage of the application 450 being able to send the data to a node 420, 430, or 440 in the cluster and the node 420, 430, or 440 forwarding the data to another node 420, 430, or 440, respectively, can be to enable an application to send data to a cluster without knowing the actual cache entry location that the data may be entered in a cache of a node in the cluster. In another example, the application 450 can send data to nodes 420, 430, and/or 440 directly. An advantage of sending the data to the nodes 420, 430, and/or 440 directly can be to reduce bandwidth usage and increase data communication efficiency.

Figure 5:
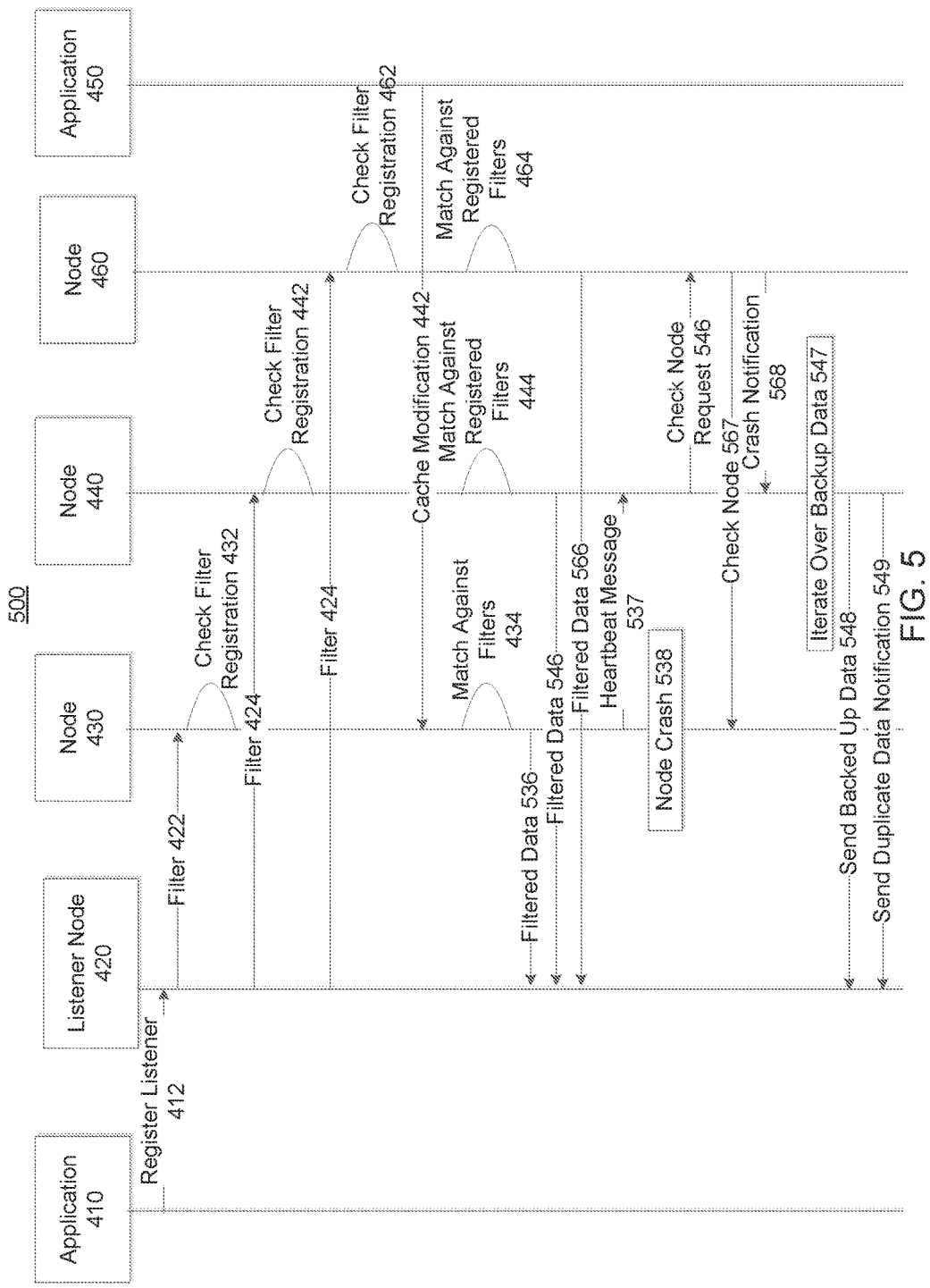
FIG. 5 is a sequence diagram of transferring data in a data grid when a node crashes according to one embodiment.

FIG. 5 depicts a flow diagram of a method 500 for transferring data in a data grid when a node crashes. Method 500 may be performed by processing logic that may comprise hardware (e.g., circuitry, dedicated logic, programmable logic, microcode, etc.), software (such as operations being performed by the MCU), firmware or a combination thereof. In one example, method 500 is performed by a processor, a plurality of processors, a processor core, and/or a plurality of processor cores. Alternatively, other components of a computing system or software executing on the processor may perform some or all of the operations of the method 500.

Referring to FIG. 5, the method 500 is substantially similar to the method discussed in the preceding paragraphs for FIG. 4A through the step of nodes 430 and 440 monitoring for cache entry events to determine when a cache entry event occurs that matches a filter registered at node 430 and/or node 440 (steps 434, 444, and 464). FIG. 5 further depicts that the node 430 or node 440 can then communicate the filtered data to the cluster listener at the listener node 420 (steps 536 and 546).

In one example, nodes in the data grid can communicate with other nodes in the data grid to indicate a topology change, a node crash, data transfers, and so forth. In another example, a first node can send heartbeat messages to a second node in the cluster to indicate that the nodes are active and operational (e.g., have not crashed). In another example, a node can communicate data to other nodes in the cluster to back up the data at the other nodes.

Returning to FIG. 5, while node 430 is active and operational, node 430 can send a heartbeat message to node 440 indicating that node 430 is active and operational (block 537). During the iteration process, while node 430 is iterating over data in the cache of the node 430 to communicate the filtered data to the listener at the node 420, node 430 may crash (block 538). In one example, node 430 may crash before the node 430 iterates over any of the data at the node 430 and/or communicates the filtered data to the listener of node 420. In another example, node 430 may crash while the node 430 is iterating over data at the node 430 and/or while node 430 is communicating the filtered data to the listener of node 420. In another example, node 430 may crash after the node 430 has iterated over data at the node 430 and has communicated the filtered data to the listener of node 420. When node 430 crashes, node 440 stops receiving the heartbeat message. When node 440 stops receiving the heartbeat message, node 440 can send a check node request to node 460 requesting that node 460 check a crash status of node 430 (step 546). When node 460 receives the check node request, node 460 can send a check node crash message to node 430 (step 567). In one example, when node 430 is active and operational (for example, when there is interference between nodes 430 and 440 that prohibits node 440 from receiving the heartbeat message), then node 460 can receive a response from node 430 indicating that the node 430 is active and operational. In another example, when node 430 has crashed, node 430 will not respond to the check node crash message from node 460.

When node 430 does not respond to the check node crash message, then node 460 can send a crash notification to node 440 indicating that node 430 has crashed (step 568). When nodes 440 and 460 determine that node 430 has crashed, nodes 440 and 460 can remove any filters that originated from node 430. In another example, when a filter is in use by a listener registered at another node (in additional to the crashed node 430), the filter may not be removed when nodes 440 and 460 determine that node 430 has crashed. When node 440 determines that node 430 has crashed, node 440 can determine what filtered data was backed up at node 440 for node 430 and can iterate over data backed up for the crashed node 430 (block 547). Then node 440 can send the backed up filtered data to the listener of listener node 420 (step 548). In one example, when a node crashes, the listener can be used in an iteration process of nodes in a data grid to fail-over data of the crashed node to prevent data from being skipped by the iteration process.

As discussed in the preceding paragraphs, node 430 may not have communicated any of the filtered data or only a portion of the filtered data to listener node 420 before crashing. In one example, node 430 may have communicated at least a portion of the filtered data to listener node 420 before crashing. In this example, when node 440 iterates over the backed up data for node 430 and sends the filtered backup data to node 420, there may be duplicative filtered data communicated to listener node 420 from nodes 430 and 440. When node 440 sends the backed up filtered data to the listener of node 420 (step 548), node 440 can also send a duplicate data notification to listener node 420 indicating that at least a portion of the backed up filtered data sent from node 440 may be duplicative of filtered data sent from node 430 to listener node 420 (block 549).

In one example, the listener node 420 can include an implementor to determine when filtered data or a cache entry event is received multiple times. An implementor can be an application or module to implement data grid services, such as when there are multiple cache entry events for the same data. In another example, the implementor can use an idempotent function to remove or avoid duplicative data in the filtered data received from the nodes crashed node 430 and backup node 440. The idempotent function is a function that can be applied to a data set with duplicative data that can provide a data set without the duplicative data. For example, an idempotent function can be applied to two equal values (e.g., duplicative data) and return one value as the result, where the one value is the value that is duplicative.

In one example, the implementor can assume that the listener node 420 receives unique filtered data or unique cache entry events (e.g., singularities in the data) for stable clusters (e.g., clusters with no or a minimal number of node crashes or clusters where nodes are not frequently added or removed). In another example, the implementor can assume the listener node 420 receives unique filtered data or unique cache entry events (e.g., singularities in the data) outside of the time span in which synthetic events occur (e.g., crash events at nodes, node additions, or node removals). In another example, for stable clusters, the iteration process can iterate over data once to provide the requested data. An advantage of using a data grid with a listener node 420 for unstable clusters (e.g., clusters with multiple node crashes or clusters where nodes are frequently added or removed) can be to provide an at-least once guarantee for the iteration process, i.e. an entry is delivered at least once and may be delivered more than once to a listener at the listener node 420.

Figure 6:
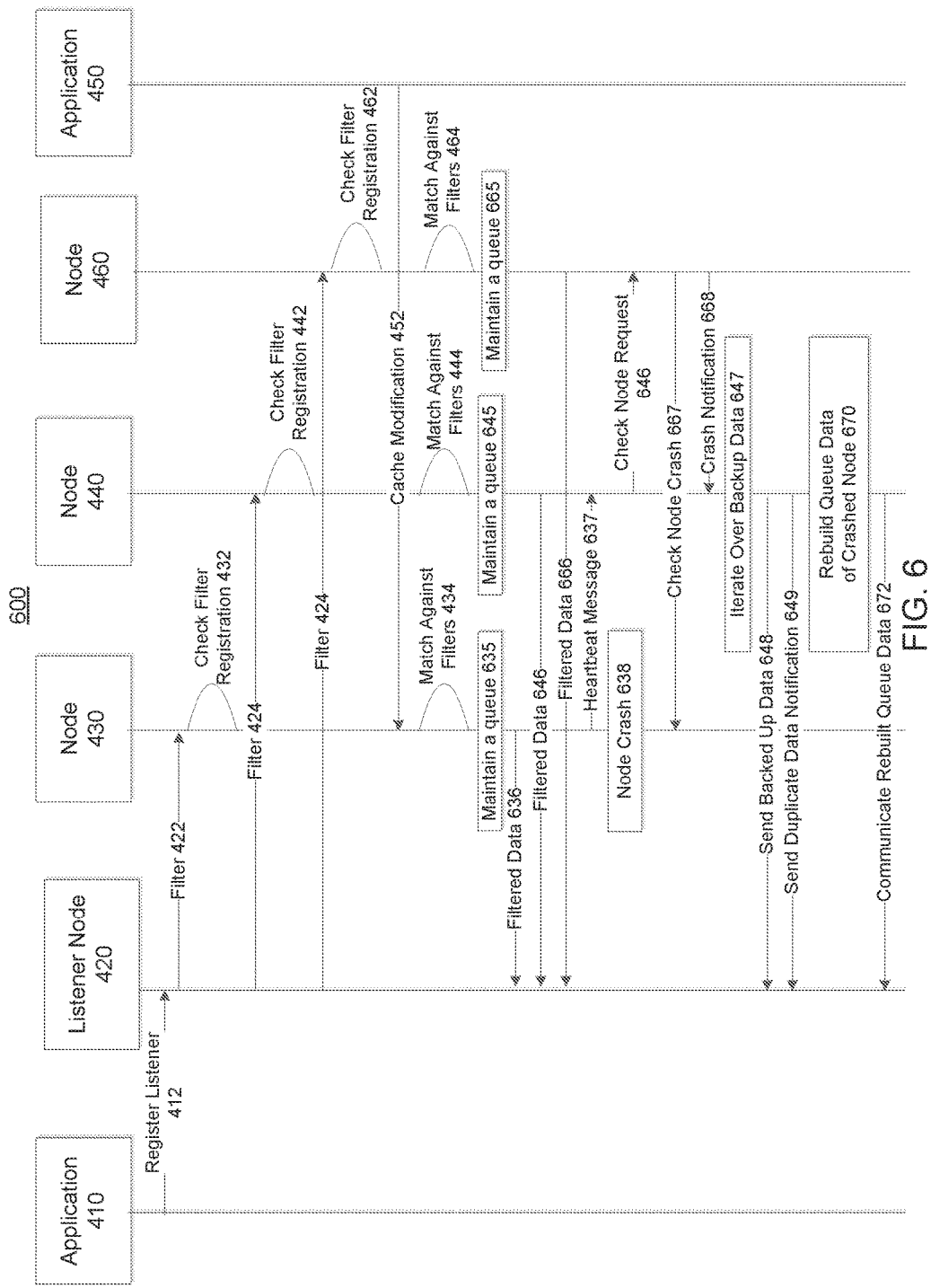
FIG. 6 is a sequence diagram of transferring data in a data grid when a queue is rebuilt for a crashed node according to one embodiment.

FIG. 6 depicts a sequence diagram of a method 600 for transferring data in a data grid when a node crashes. Method 600 may be performed by processing logic that may comprise hardware (e.g., circuitry, dedicated logic, programmable logic, microcode, etc.), software (such as operations being performed by the MCU), firmware or a combination thereof. In one example, method 600 is performed by a processor, a plurality of processors, a processor core, and/or a plurality of processor cores. Alternatively, other components of a computing system or software executing on the processor may perform some or all of the operations of the method 600.

Referring to FIG. 6, the method 600 is substantially similar to the method discussed in the preceding paragraphs for FIG. 4A through the step of nodes 430 and 440 monitoring for cache entry events to determine when a cache entry event occurs that matches a filter registered at node 430 and/or node 440 (steps 434, 444 and 464). Nodes 430, 440, and/or 460 can maintain queues of modifications that occur at the node where the queue is located (blocks 635, 645, and 665). The nodes 430, 440, and 460 can then communicate the filtered data to the listener at the listener node 420 (steps 636 and 646, and 666).

While node 430 is active and operational, node 430 can send a heartbeat message to node 440 indicating that node 430 is active and operational (step 637). When node 430 crashes, node 440 stops receiving the heartbeat message. When node 440 stops receiving the heartbeat message, node 440 can send a check node request to node 460 requesting that node 460 check a crash status of node 430 (step 646). When node 460 receives the check node request, node 460 can send a check node crash message to node 430 (step 667). In one example, when node 430 is active and operational (for example when there is inference between nodes 430 and 440 that prohibit node 440 from receiving the heartbeat message), then node 460 can receive a response from node 430 indicating that the node 430 is active and operational. In another example, when node 430 has crashed, node 430 will not respond to the check node crash message from node 460.

When node 430 does not respond to the check node crash message, then node 460 can send a crash notification to node 440 indicating that node 430 has crashed (step 668). When nodes 440 and 460 determine that node 430 has crashed, nodes 440 and 460 can remove any filters that originated from node 430. In another example, when a filter is in use by a listener registered at another node, the filter may not be removed when nodes 440 and 460 determine that node 430 has crashed. When node 440 determines that node 430 has crashed, node 440 can iterate over data backed up for the crashed node 430 and determine what filtered data was backed up at node 440 for node 430 (step 647). When node 440 determines what filtered data was backed up at node 440 for node 430, then node 440 can send the backed up filtered data to the listener of listener node 420 (step 648). In another example, when a node crashes, the listener can be used in an iteration process of nodes in a data grid to fail-over data of the crashed node to prevent data from being skipped by the iteration process.

As discussed in the preceding paragraphs, node 430 may not have communicated any of the filtered data to listener node 420 before crashing. In one example, node 430 may have communicated at least a portion of the filtered data to listener node 420 before crashing and there may be duplicate filtered data communicated to listener node 420 from nodes 430 and 440. When node 440 sends the backed up filtered data to the listener of node 420 (step 648), node 440 can also send a duplicate data notification to listener node 420 indicating that at least a portion of the backed up filtered data sent from node 440 may be duplicative of filtered data sent from node 430 to listener node 420 (step 649). In one example, consistent hashing can be used to determine at what node active data is stored and at what node backup data is stored.

When the node 430 crashes, the queue maintained at node 430 may be lost. When node 440 iterates over the backup data, the node 440 can also rebuild the queue data of crashed node 430 (step 670). In one example, application 450 can randomly write data to node 440 (e.g., a cache modification). In this example, an owner of the cache modification can be node 430, where the owner is the node including a designated cache location for a cache modification. For example, node 430 can be a designated owner of banking information or banking transactions for an individual. Node 440 can use consistent hashing to determine that the cache modification is owned by node 430 and can be forwarded the cache modification to node 440 to write in the cache of node 440. For example, nodes 430 and 440 can communicate when cache modification information is received at either node 430 or 440. When cache modification information is received at node 430 or 440, the nodes 430 and 440 can analyze the information to determine a designated cache location for the information or a type of the information.

In one example, when node 440 initially receives the cache modification from application 450, node 440 can make a backup copy of the cache modification before forwarding the cache modification to node 440. When node 430 crashes, then node 440 can re-compute a queue of the cache modifications forwarded to node 430 during the iteration process. For example, node 440 can examine the cache modifications that node 440 forwarded to node 430 and determine the forwarded cache modifications that match the filter. The node 440 can rebuild the queue data of node 430 by re-computing the cache modifications that were in the queue of node 430 using the forwarded cache modifications that match the filter. When node 440 has rebuilt the queue data for crashed node 430, node 440 can communicate the rebuilt queue data to node 420 (step 672).

An advantage of rebuilding the queue data of the crashed node can be to avoid losing cache entries at the failed node that occurred during the iteration process prior to the node failure. For example, when a node in a cluster fails during an iteration process at the node, cache entries that occurred at cache entry locations where the cache had already been iterated over during the iteration process would be lost if the queue data of the crashed node was not rebuilt.

Figure 7:
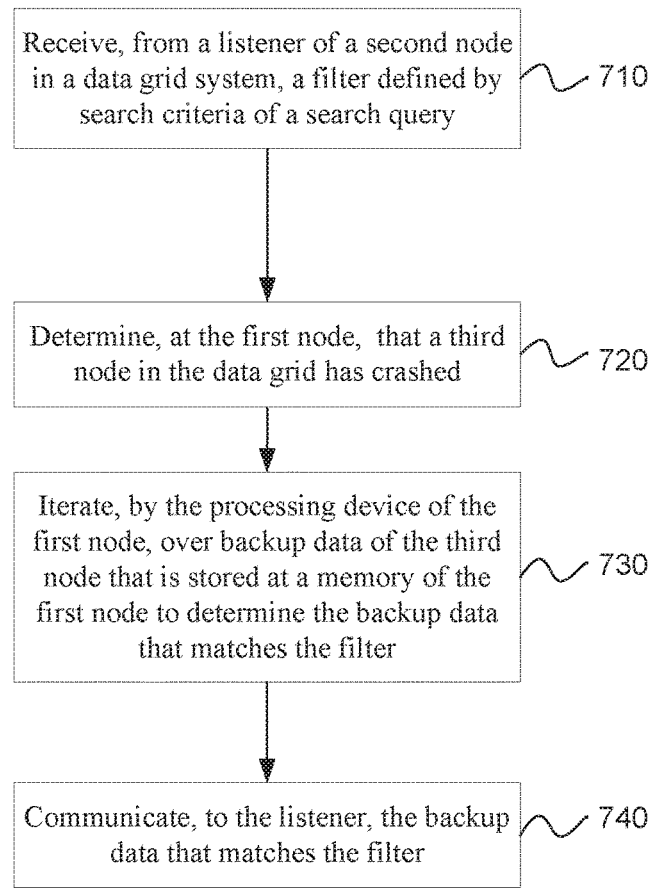
FIG. 7 is a flow diagram of a functionality of a processing device including a non-transitory storage medium having stored thereon instructions which when executed cause the processing device to execute operations to communicate backup data to a listener in a data grid system according to one embodiment.

FIG. 7 is a block diagram of a method 700 of communicating backup data to a listener in a data grid system. Referring to FIG. 7, method 700 can begin by receiving, from a listener of a second node in a data grid system, a filter defined by search criteria of a search query (block 710). The method can further include determining, at the first node, that a third node in the data grid has crashed (block 720). The method can further include iterating, by the processing device of the first node, over backup data of the third node that is stored at a memory of the first node to determine the backup data that matches the filter (block 730). The method can further include communicating, to the listener, the backup data that matches the filter (block 740).

In one example, the method can further include communicating, to the listener, a duplicate data notification. The duplicate data notification can indicate that the communicated backup data may comprise, at least in part, data duplicative to filtered data communicated to the listener from the third node. In another example, the method can further include communicating, to the listener, data from a memory coupled to the processing device that matches the filter. In another example, the receiving, determining, iterating, and communicating operations occur during an iteration period of the search query. In another example, the first node, the second node, and the third node are part of a node cluster in the data grid system.

In one example, the method can further include removing, at the first node, filters received from the third node when the processing device determines that the third node has crashed. In another example, the method of determining that the third node has crashed further include: receiving, from the third node, heartbeat messages at periodic intervals, wherein each heartbeat message indicates that the third node is active; determining that a heartbeat message has not been received at the first node within a threshold period of time; communicating, to a fourth node in the data grid, a check node request, wherein the check node request requests that the fourth node verify that the third node has crashed; receiving, from the fourth node, a crash notification when the third node has not responded to the check node request within a threshold period of time; and determining that the third node has crashed in view of the crash notification. In another example, the method can further include rebuilding a queue of modifications for the third node when the third node has crashed. In another example, the method can further include communicating the rebuilt queue to the listener.

Figure 8:
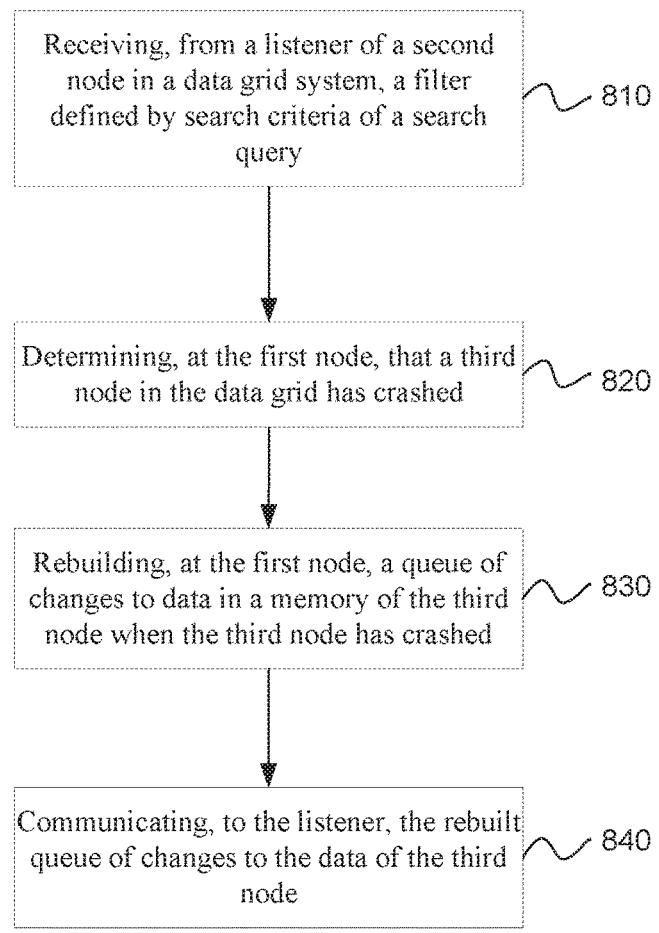
FIG. 8 is a flow diagram of a functionality of a processing device including a non-transitory storage medium having stored thereon instructions which when executed cause the processing device to execute operations to communicate a rebuilt queue to a listener in a data grid system according to one embodiment.

FIG. 8 is a flow diagram of a method 800 of communicating rebuilt queue to a listener in a data grid system. Referring to FIG. 8, the method by receiving, from a listener of a second node in a data grid system, a filter defined by search criteria of a search query (block 810). The method determining, at the first node, that a third node in the data grid has crashed (block 820). The method can further include rebuilding, at the first node, a queue of changes to data in a memory of the third node when the third node has crashed (block 830). The method can further include communicating, to the listener, the rebuilt queue of changes to the data of the third node (block 840).

The method can further include communicating, to the listener, data from a memory coupled to the processing device that matches the filter. In one example, the method can further include iterating over, at the first node, backup data of the third node that is stored at the memory to determine the backup data that matches the filter and communicate, to the listener, the backup data that matches the filter. In another example, the rebuilt queue of changes to the data of the third node occurs during an iteration period of the search query. In another example, the method further includes recording, into a queue, modifications to the memory of the first node during an iteration period.

In one example, the method further includes communicating the queue of the first node to the listener. In another example, the method of determining that the third node has crashed further includes: receive, from the third node, heartbeat messages at periodic intervals, wherein each heartbeat message indicates that the third node is active; determine that a heartbeat message has not been received at the first node within a threshold period of time; communicate, to a fourth node in the data grid, a check node request, wherein the check node request requests that the fourth node verify that the third node has crashed; receive, from the fourth node, a crash notification when the third node has not responded to the check node request within a threshold period of time; and determine that the third node has crashed in view of the crash notification.

Figure 9:
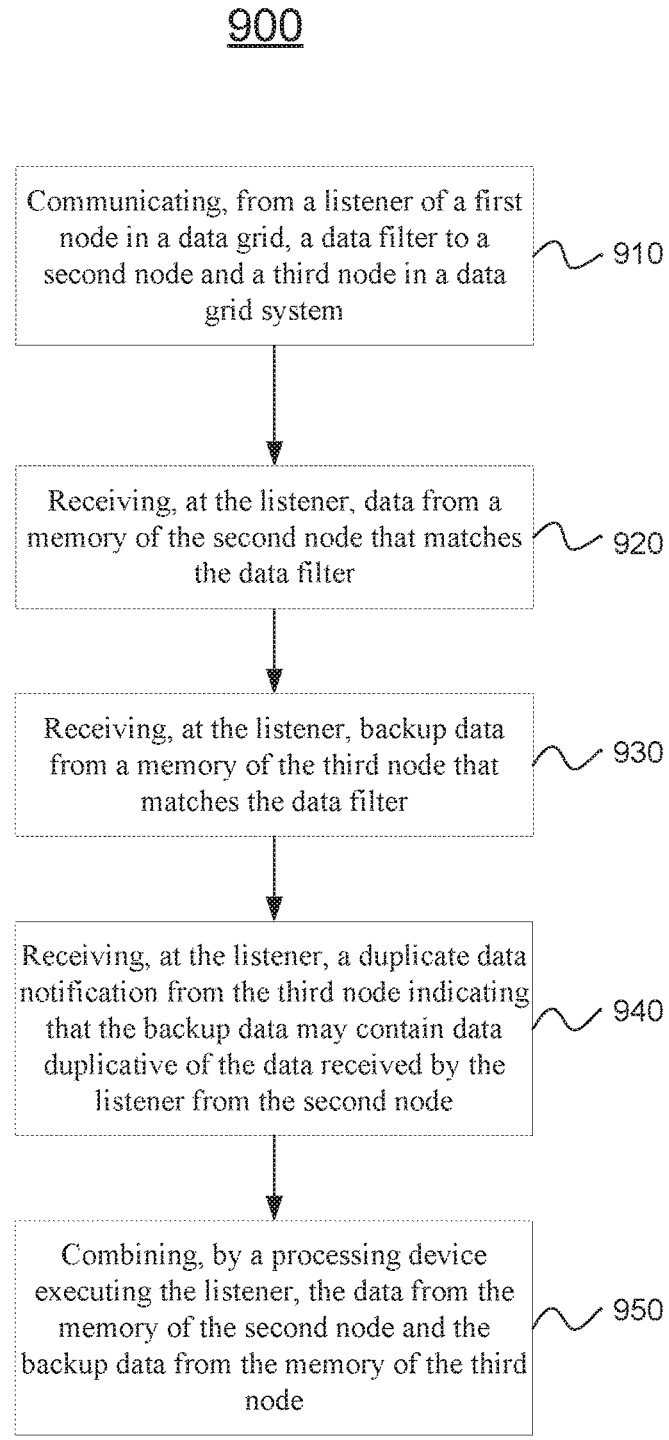
FIG. 9 is a flow diagram of a method of communicating backup data to a listener in a data grid system according to one embodiment.

FIG. 9 depicts a flow diagram of a method 900 of communicating backup data in a data grid system. Referring to FIG. 9, the method 900 begins by communicating, from a listener of a first node in a data grid, a data filter to a second node and a third node in a data grid system (block 910). The method can further include receiving, at the listener, data from a memory of the second node that matches the data filter (block 920). The method can further include receiving, at the listener, backup data from a memory of the third node that matches the data filter (block 930). The method can further include receiving, at the listener, a duplicate data notification from the third node indicating that the backup data may contain data duplicative of the data received by the listener from the second node (block 940). The method can further include combining, by a processing device executing the listener, the data from the memory of the second node and the backup data from the memory of the third node (block 950). In one example, the combining includes adding, to the data from the memory of the second node, a portion of the backup data from the memory of the third node that does not contain the duplicative data In one example, the backup data is data of the second node stored at the third node. In another example, the backup data is communicated by the third node when the second node has crashed. In another example, the method can further include removing a duplicative data point of the duplicative data using an idempotent function. In another example, the method can further include receiving, at the listener when the second node has crashed, a rebuilt queue of changes to data of the second node. When the listener has received the filtered data, backup data, queue data, and/or rebuilt queue data from the nodes in the node cluster, the listener can aggregate the different received data. When the listener aggregates the different data, the listener can organize or arrange the data to provide a full or complete query result with data in a correct order. An advantage of aggregating and arranging the data can be to avoid query results with missing data (e.g., overlooked data) or query results with data that is out of order. In one example, the listener can use the queued data and/or the rebuilt queue data to determine an order of the data. In another example, the listener can use the backup data and/or the rebuilt queue data to provide query results without overlooking data (e.g., without missing data because of a crashed node).

Figure 10:
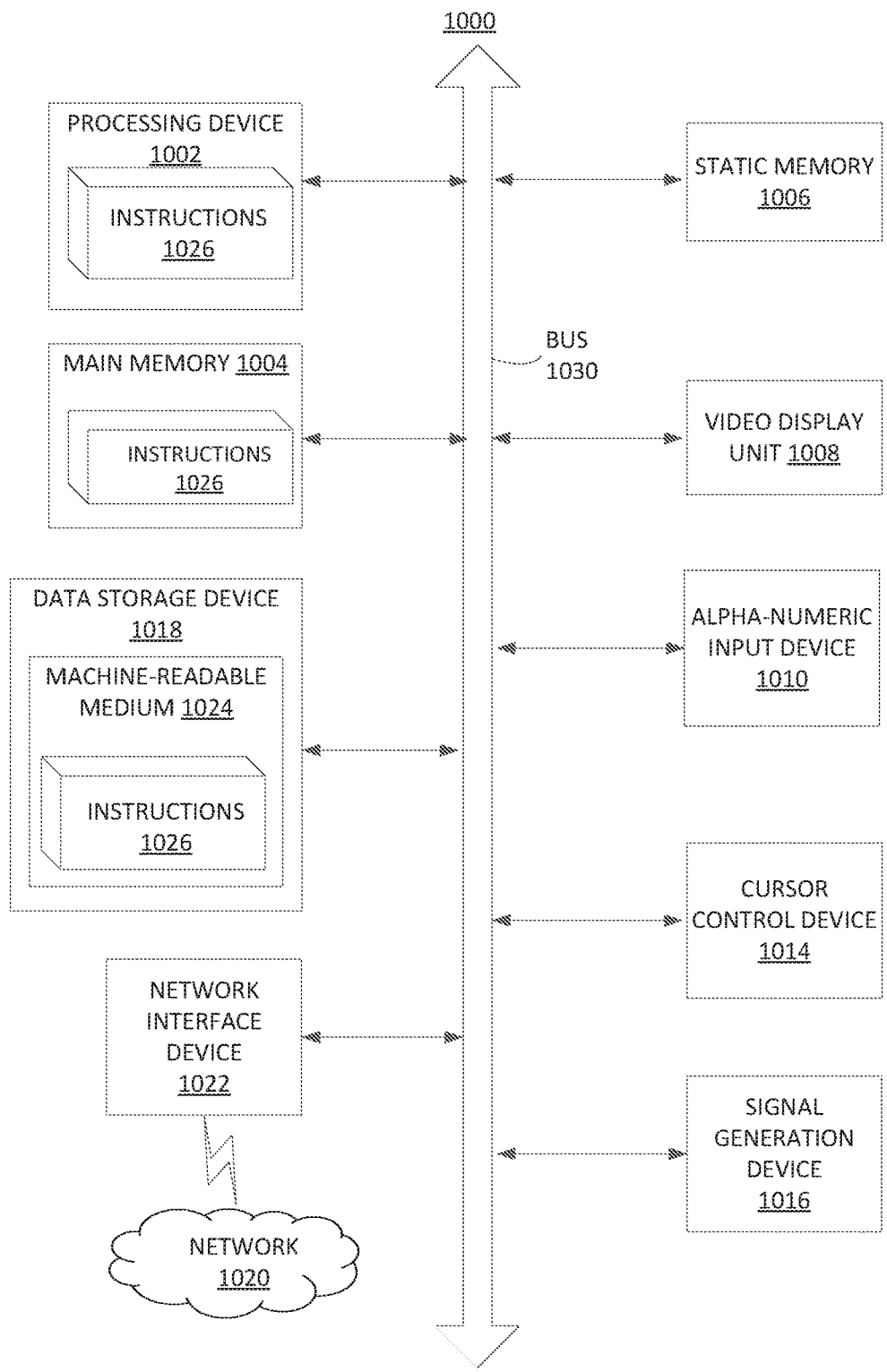
FIG. 10 illustrates a block diagram of one implementation of a computer system.

FIG. 10 illustrates a diagrammatic representation of a machine in the exemplary form of a computer system 1000 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1016, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field-programmable gate array (FPGA), a digital signal processor (DSP), network processor, or the like. The processing device 1002 is configured to execute instructions 1026 for performing the operations and steps discussed herein.

The computer system 1000 may further include a network interface device 1028. The computer system 1000 also may include a video display unit 1008 (e.g., a liquid crystal display (LCD), a cathode-ray tube (CRT), or a touch screen), an alphanumeric input device 1010 (e.g., a keyboard), a cursor control device 1012 (e.g., a mouse), and a signal generation device 1014 (e.g., a speaker).

The data storage device 1016 may include a machine-readable storage medium 1018 on which is stored one or more sets of instructions 1026 (e.g., software) embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting computer-readable storage media. The instructions 1026 may further be transmitted or received over a network 1020 via the network interface device 1028.

While the machine-readable storage medium 1024 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A non-transitory computer readable storage medium having instructions that, when executed by a processing device of a first node in a data grid system, cause the processing device to:
   receive, from a second node in the data grid system, a first filter;
   detect a failure of a third node of the data grid system;
   determine that backup data stored at the first node matches the first filter; and
   send, to the second node, a duplicate data notification indicating that the backup data comprises, at least in part, first data duplicative to second data communicated to the second node from the third node.

2. The non-transitory computer readable storage medium of claim 1, wherein the processing device is further to communicate, to the second node, a part of the first data that matches the first filter.

3. The non-transitory computer readable storage medium of claim 1, wherein the processing device is to receive, detect, determine, and send during an iteration period of a search query defined by search criteria of the first filter.

4. The non-transitory computer readable storage medium of claim 1, wherein the first node, the second node, and the third node are part of a node cluster in the data grid system.

5. The non-transitory computer readable storage medium of claim 1, wherein in response to the failure of the third node, the processing device is further to remove a second filter received from the third node.

6. The non-transitory computer readable storage medium of claim 1, wherein to detect the failure of the third node, the processing device is further to determine that a heartbeat message initiated by the third node has not been received at the first node within a threshold period of time.

7. The non-transitory computer readable storage medium of claim 1, wherein to detect the failure of the third node, the processing device is further to:
   determine that a heartbeat message initiated by the third node has not been received at the first node within a first threshold period of time;
   in response to not receiving the heartbeat message within the first threshold period of time, send a check node request to a fourth node in the data grid system; and
   receive a failure notification from the fourth node.

8. The non-transitory computer readable storage medium of claim 1, the processing device further to:
   rebuild a queue of one or more modifications to a second memory of the third node; and
   communicate the queue to the first node.

9. The non-transitory computer readable storage medium of claim 8, wherein the one or more modifications comprise at least one of: a cache write, a cache entry removal or deletion, or a cache modification.

10. A system comprising:
    a first memory to store data; and
    a processor coupled to the first memory, the processor to:

maintain a queue indicating one or more modifications to data in a cache of a first node in a data grid system, wherein the one or more modifications comprise at least one of a cache write, a cache entry removal or deletion, or a cache modification;
detect a failure of the first node in the data grid has crashed; and
send the queue to a second node.

11. The system of claim 10, wherein the processor is further to order the queue to indicate modifications that occurred during an iteration period.

12. The system of claim 10, the processor further to:
receive a filter from the first node;
determine the data stored at the first memory matches the filter; and
send at least a portion of the data that matches the filter to the second node.

13. The system of claim 10, the processor further to:
rebuild the queue to obtain a rebuilt queue of the one or more modifications to the data in the cache when the first node has crashed, wherein the processor is further to rebuild the queue during an iteration period of a search query to define a filter; and
send the rebuilt queue to the second node.

14. The system of claim 13, wherein the processor is further to record the one or more modifications during the iteration period.

15. A system comprising:
a first memory to store data; and
a processor coupled to the first memory, the processor to:
maintain a queue indicating one or more modifications to data in a second memory of a first node in a data grid system;
detect a failure of the first node in the data grid has crashed; and
send the queue to a second node, wherein to detect the failure of the first node, the processor is further to:
determine that a heartbeat message initiated by the first node has not been received from the first node within a threshold period of time;
communicate a check node request to a third node;
receive a failure notification from the third node; and
determine that the first node has crashed in view of the failure notification.

16. A method comprising:
sending, from a first node, a data filter to a second node;
receiving, at the first node, first data from a first memory of the second node that matches the data filter;
sending, from the first node, the data filter to a third node;
receiving, at the first node, backup data from a second memory of the third node that matches the data filter; and
adding at least a portion of the backup data to the first data, wherein the portion of the backup data that does not include second data that is duplicative of the first data.

17. The method of claim 16, further comprising receiving, at the first node, a duplicate data notification from the third node indicating that the backup data comprises third data duplicative of the second data received from the second node.

18. The method of claim 16, wherein the first node, the second node, and the third node are in a data grid system.

19. The method of claim 16, wherein:
the backup data is third data of the second node stored at the third node; and
the backup data is sent by the third node to the first node when the second node has crashed.

20. The system of claim 10, wherein to detect the failure of the first node, the processor is further to:
determine that a heartbeat message initiated by the first node has not been received from the first node within a threshold period of time;
communicate a check node request to a third node;
receive a failure notification from the third node; and
determine that the first node has crashed in view of the failure notification.

\* \* \* \* \*